United States Patent Office 3,383,285
Patented May 14, 1968

3,383,285
LIQUID REFLECTOR CONTROL FOR
NUCLEAR REACTORS
Ronald Tunstall Ackroyd, Upton-by-Chester, and Maurice Arthur Perks, Stockton Heath, Warrington, England, assignors to United Kingdom Atomic Energy Authority, London, England
Filed Dec. 16, 1966, Ser. No. 602,290
Claims priority, application Great Britain, Dec. 23, 1965, 54,509/65
8 Claims. (Cl. 176—18)

ABSTRACT OF THE DISCLOSURE

A nuclear reactor having a core surrounded by a segmented reflector, variation of the reflector geometry to obtain a measure of reactivity control being effected by making the reflector segments extend in juxtaposed relationship from at least top to bottom of the core, forming each segment as a separate liquid reflector container and independently varying the content of reflector liquid in the containers which latter may be accomplished by varying gaseous pressure on a free surface of the liquid in any container to vary the liquid level therein. A typical reflector liquid is molten at minimum reactor operating temperatures and may be a lead base alloy, for example, a binary alloy of lead and magnesium. The reflector liquid may carry fertile material.

---

The present invention relates to nuclear reactors; more specifically it concerns nuclear reactors which have a core surrounded by a segmented reflector. Variation of reflector geometry enables neutron leakage from the core to be varied and hence a measure of reactivity control is obtainable thereby. Hitherto, so far as we are aware, individual adjustability of reflector segments has been confined to cases where the reflector material of the segments is solid. This of course requires machinery for moving the segments. An object of the invention is to provide a variable geometry segmented reflector which does not require machinery for moving it.

According to the invention, in a nuclear reactor having a core with a surrounding segmented reflector, the reflector segments extend in juxtaposed relationship at least from top to bottom ends of the core and each comprises a separate liquid reflector container, there being also included means enabling the reflector liquid content in any pair of mutually adjacent containers to be varied independently of one another. Thus, although individual variability is preferred, the alternative is available of effecting the variation in groups made up of containers which are not mutually adjacent. Quite apart from the feature that mechanical operation is replaced by operation on hydraulic principles, the latter being in general simpler and therefore more reliable, there is also inherent in the invention the feature that reactivity control is obtainable with comparatively little neutron flux distortion, particularly in the direction of the height of the core, which is commonly the axial direction. However, in order to realise this latter feature to best advantage, the containers should be as numerous as is practical and the preferred operating procedure would be to adjust them to various combinations of the full and empty conditions, the combinations being selected to give more or less even distribution around the core of those in the one condition among those in the other condition. It is for this reason that when control in groups is employed the containers in each group should not be mutually adjacent; in other words each container in each group should have at least one other container intervening between itself and the nearest neighbour in the same group.

In a preferred form of the invention, each container extends some distance beneath the core and has a limb extending upwardly from its lower end so that the container with its upstanding limb is analogous to a U-tube, either the container or the upstanding limb being adopted at the upper end for admission of a gaseous medium at different pressures which will alter the level in the container of a mass of liquid reflector contained therein. A rather different alternative is available with liquid reflectors which are readily vapourisable: bearing in mind that the proximity of the containers to the core is bound to lead to heating of the liquid reflector content, if only by the attenuation of gamma radiation, one can utilise a change of the phase of the reflector from liquid to vapour, and vice versa, for the purpose of varying the content of liquid reflector in the containers. Temperature change may be effected by varying circulation rate through the containers, but this method used alone is likely to produce the change to vapour rather more slowly than is needed for shut-down purposes. Therefore, if the reflector is to be relied on for shut-down, it would be preferred that the containers are connectable selectively to a low pressure region by which liquid reflector in the containers is converted to the vapour phase. This condition of occupation by vapour should be regarded as equivalent to the empty condition referred to elsewhere herein. Water is of course a leading example of a vapourisable liquid reflector; if the core is cooled by water, the reflector containers can be supplied from the main coolant circuit.

The reflector liquid in the containers may advantageously be used to carry fertile material. Such fertile material may be a component of the container liquid or may be a homogeneous mixture therewith to form a paste or slurry. Alternatively, the fertile material may be formed as a body which is buoyant in the container liquid.

Whether the liquid reflector is supplied from the main coolant circuit or not, it is convenient for both liquid reflector and coolant to be the same. This is so in the case of the example of the invention illustrated diagrammatically in the accompanying drawings. In these drawings.

Figure 1:
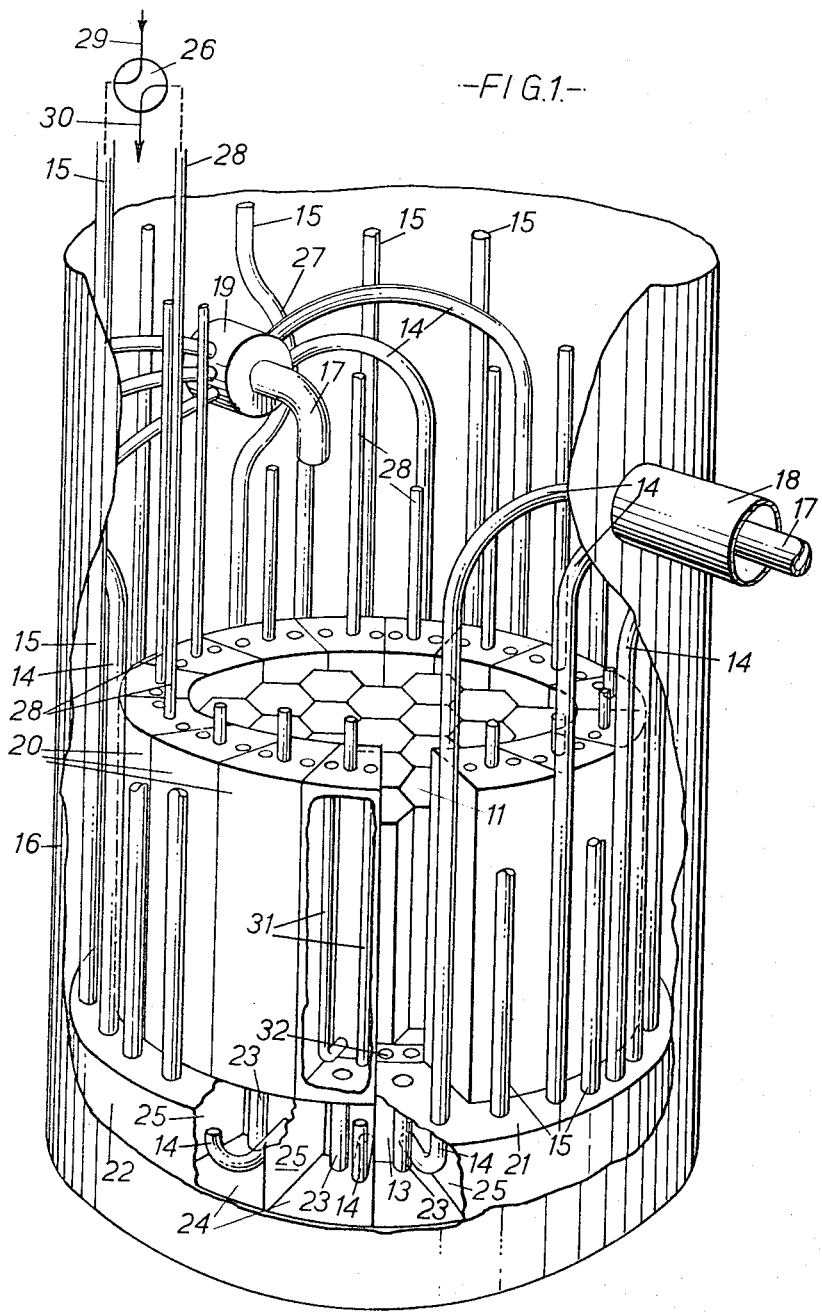
FIG. 1 is a diagrammatic isometric view of a fast nuclear reactor.

In the illustrated example, the reactor is cooled by liquid metal; instead of the coolant being the more usual low melting point alkali metal, such as sodium, it is an alloy of lead and magnesium in proportions giving a low melting point. For example, with 95% by weight of lead and the balance magnesium the melting point is about 250° C.

The reactor core is composed of upstanding fuel assemblies 11 having open-topped hexagonal wrappers in which are carried clustered fuel pins or rods. The fuel assemblies are supported in cantilever fashion, closely packed together, by the fitting of apertured bottom end spikes thereof into sockets, these sockets being built into a coolant inlet plenum approximating to a flat cylinder of which the cylindrical wall appears at 13; coolant is pumped into the inlet plenum 13 through inlet pipes 14 which alternate with other pipes 15 to form a ring of closely spaced pipes adjacent the wall of an upright cylindrical tank 16 containing the core. From the inlet plenum the coolant flows through the fuel assemblies and at the upper outlet end of the core passes into outlet ducts such as 17 for transfer to heat exchangers before returning to the pumps. Although not shown, it is to be understood that the heat exchangers and pumps are contained in other separate tanks and that the assembly of tanks is so arranged that under conditions of full load operation of the reactor the level of coolant in the tank 16 at the outlet end of the core remains below the horizontal length of the outlet ducts 17, this horizontal length being within a respective outer duct 18 to form coaxial ducting. In the heat exchanger tanks the outlet ducts 17 have downwardly extending spouts for dipping into the coolant in these tanks; syphon flow of the coolant therefore takes place with the advantage that the construction at the entry of the coaxial ducting into the respective heat exchange tank becomes less of a problem through not being exposed to coolant in the tank. An exhauster connection (not shown) to the horizontal lengths of the outlet ducts 17 is of course necessary to establish the syphon flow. The coolant being returned to the tank 16 by the pumps passes through the outer ducts 18 to annular distributor heads such as 19 to which the inlet pipes 14 are connected.

Interposed between the core and the ring of pipes 14 and 15 is a ring of juxtaposed elongated containers 20 having a truncated sectorial shape in plan view so that together they form an annulus. The same juxtaposed relationship is obtainable by fitting radial division plates in a deep annular vessel but manufacture is likely to be more difficult. Furthermore, the inwardly directed faces of the containers may be differently shaped to conform more closely to the core outline. The containers 20 stand on an outwardly projecting ledge 21, included as part of fixed core support structure 22 in which the inlet plenum 13 is formed.

Each of the containers 20 is sealed to a respective pipe, such as 23, which acts as a lower extension to the container and dips almost to the bottom of a respective sump compartment such as 24, these compartments being formed by radial partitions 25 installed, in a manner sealing the compartments from one another, in an annular space provided in the core support structure 22 around the inlet plenum 13. It is into these compartments that the lower ends of the pipes 15 open. Each of the upstanding pipes 15 extends upwardly to a respective valve, of which only one is shown as indicated at 26, these valves being situated in the roof of a vault in which the tank 16 is housed. The pitch of the pipes 15 may be non-uniform in places, for example for the purpose of circumventing the annular distributor heads 19 as indicated at 27.

Vent pipes 28 extend upwards from the tops of the containers 20 and these also may be best arranged with some non-uniformity of pitch, for example, to leave clear wider spaces above the reflector containers for the accommodation of discharged fuel assemblies which are being stored temporarily in submerged conditions to allow the dissipation of decay heating. The vent pipes may simply open at their upper ends into a blanket gas space above the level of coolant in the tank 16 where a blanket gas, such as argon, is maintained at a slightly superatmospheric pressure. Alternatively, the vent pipes may, as is shown in the drawing, be connected to the respective valves 26; the purpose of such connection will be amplified subsequently.

It will be appreciated that each container in combination with the respective pipes 15, 23 and sump compartment 24 is analogous to a U-tube. Into each such combination there is charged a mass of the same alloy as is used for the coolant, the volume of this mass being such that the container can be substantially filled without having to depress the level in the sump compartment beyond the lower end of the dip pipe 23. A supply of gas, conveniently argon like the blanket gas, is therefore made available at a pressure sufficient to depress the level in the sump compartment to the extent necessary for filling the respective container, and the valve 26 of each pipe 15 is arranged such that this high pressure supply, as indicated at 29, can be admitted selectively to the pipes 15. It is preferred that the alternative connection afforded by the valves is with the blanket gas space or some other region where the pressure is the same. This alternative connection, as indicated at 30, is to be used to achieve the empty condition of the container, that is to say, the condition in which the liquid level therein is dropped to a lower level at least as low as the lower end of the fuelled length of the core. Thus, in conjunction with the dimensions of the containers, sump compartments and pipes, the volume of the liquid content should also satisfy the requirement that the common level in the absence of pressure differential is at least as low as previously mentioned.

Insofar as the segmented reflector may be required for rapid shut down of the reactor, it may be desirable to augment the gravitational force which empties the containers when the pressure is removed from the pipes 15. For this purpose the valve illustrated at 26 is a change-over valve which, on connecting the pipe 15 to the blanket gas space represented by connection 30, simultaneously connects the respective vent pipe 28 to the high pressure supply represented by 29. Consequently, when the valve is operated in this sense, a blast of high pressure gas is directed into the respective container to hasten the expulsion of liquid reflector. This rapid expulsion facility is self-proving in that the high pressure supply on which it relies must be available for the container to be filled.

For cooling the containers, it may suffice simply to arrange that a small flow of the coolant by-passes the fuel assemblies; this arrangement would be more feasible with increasing numbers of containers and therefore smaller container sizes. In this respect, the reader should realise that fewer containers are shown in the drawing than would probably be desirable in practice; furthermore the pipes 14 and 15 in the ring around the reflector have been opened out for clarity and in practice would be more closely packed to fill as much as possible of the space between the segmented reflector and thermal shielding (not shown) lining the inside wall of the tank 16. The cooling of the containers may alternatively be achieved by piping a cooling fluid through the containers and in the drawing such a cooling system is represented by two tubes 31 which are connected through bleed holes 32 with the inlet plenum 13 so that a steady but restricted flow of the metal coolant passes through the cooling tubes to the outlet end of the core.

The segmented reflector represented by the containers 20 is used for operational control by selectively operating the valves 26 to achieve either the full or the empty conditions. As mentioned earlier, it is preferred that at any time the containers in the one condition are substantially uniformly distributed among the containers in the other condition. For emergency shut-down a means will be provided which can operate all of the valves simultaneously to remove pressure from the pipes 15 with the consequence that the core becomes virtually unreflected and therefore suffers a considerable loss of reactivity. Alternate ways of removing the pressure are possible depending on the nature of the high pressure supply: for example, a reservoir acting as this supply could simply be vented.

Other features also contribute notably to the safety of this reactor, namely the relatively low coolant pressure required and the absence of chemical reaction of the coolant with water. This reactor is therefore considered suitable for marine applications and in this role may be arranged so that the heat output is converted to propulsive power in a Stirling engine.

Figure 2:
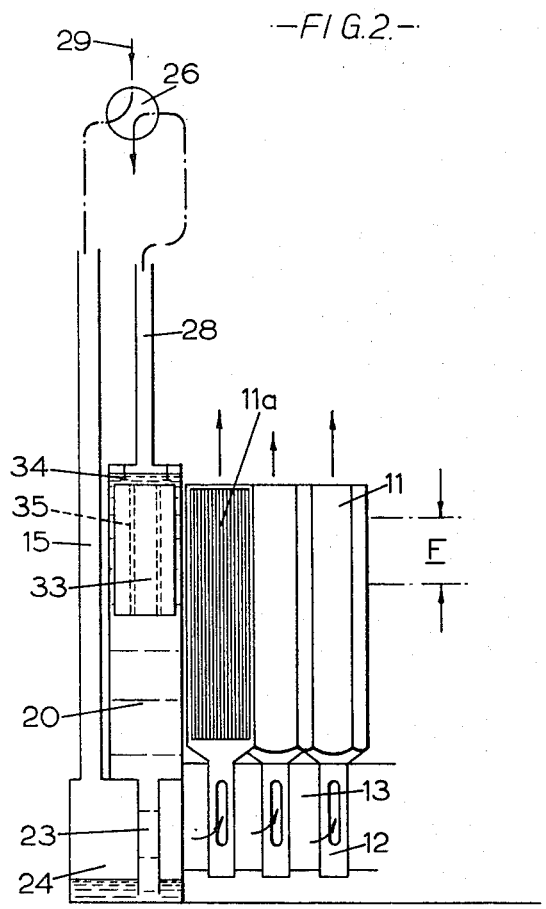
FIG. 2 shows diagrammatically such parts as are relevant to a modification of the reactor of FIG. 1.

In the modification of FIG. 2, wherein parts already referred to are indicated by the same reference numerals, there is disposed within each container a breeder body 33 of natural or depleted uranium dioxide clad with a ferrous metal, the specific gravity of the body being such that it is buoyant in the container liquid. The length of the body is about half the height of the container and when, by filling of the container, it is lifted to an upper position defined by an upper stop 34, it lies alongside the fuelled length F of the clustered fuel pins or rods represented, on account of their thinness, by the straight lines 11a. The reader should realise that only this short length F of the fuel pins contains the enriched fuel; the remaining length is made up of breeder and reflector sections and also voidage to act as a reservoir for fission product gases. When liquid is expelled from the container the breeder body 33 drops to a lower position below the fuelled length of the core and therefore leads to a considerable loss of reactivity.

It will be appreciated that such further features as to following may be desirable: a detachable container head to facilitate removal of the breeder body for reprocessing, guides for locating the breeder body in its travel between the upper and lower positions and the addition of suitable cooling to remove heat generated within the breeder bodies. The latter may be afforded by passages 35 extending lengthwise through the breeder body 33 allowing a natural convection cooling flow of the container liquid through the body.

It will be appreciated that the high specific gravity of the lead base alloy used as coolant is of advantage in enabling a large amount of heavy atom material to be incorporated in the breeder body whilst still preserving buoyancy. Other coolants which could give something of this advantage are bismuth and bismuth/lead alloys. Nevertheless lead is preferred to bismuth because the irradiation-induced activity is less. When use is made for the breeder body of currently favoured refractory compounds of the heavy atom material, for example the dioxides, this body can be virtually solid and still be buoyant.

What we claim is:

1. A nuclear reactor having a core with a surrounding segmented reflector, wherein the reflector segments extend in juxtaposed relationship at least from top to bottom ends of the core and each comprises a separate liquid reflector container, there being also included means enabling the reflector liquid content in any pair of mutually adjacent containers to be varied independently of one another.

2. A nuclear reactor according to claim 1, wherein the means enables individual variation of the reflector liquid levels in the containers.

3. A nuclear reactor according to claim 1, wherein each container extends below the bottom end of the core and a limb extends upwardly from the lower end of the container, the reflector liquid forming free surfaces respectively in the containers and the upstanding limb and the means comprising a variable pressure supply of gaseous medium applied to one of the free surfaces.

4. A nuclear reactor according to claim 1, wherein each container has a truncated sectorial shape in plan view whereby the containers collectively form an annulus.

5. A nuclear reactor according to claim 1, wherein the reflector liquid in the containers carries fertile material.

6. A nuclear reactor according to claim 5, wherein the fertile material is incorporated in a body which is buoyant in the reflector liquid.

7. A nuclear reactor according to claim 6, wherein the reflector liquid is a lead base alloy having a melting point low enough for the alloy to be molten at the minimum temperature prevailing in the containers during operation of the reactor.

8. A nuclear reactor according to claim 7, wherein the alloy is a binary allow of lead and magnesium.

References Cited

UNITED STATES PATENTS

| 3,211,623 | 10/1965 | Tower | 176—42 |
| 3,284,307 | 11/1966 | Schortmann | 176—22 |
| 3,287,225 | 11/1966 | Ackroyd et al. | 176—33 |

FOREIGN PATENTS 1,355,718  2/1964  France.

BENJAMIN R. PADGETT, *Primary Examiner.*

L. DEWAYNE RUTLEDGE, *Examiner.*

H. E. BEHREND, *Assistant Examiner.*